(12) United States Patent
Willén et al.

(10) Patent No.: US 12,051,524 B2
(45) Date of Patent: Jul. 30, 2024

(54) SUPERCONDUCTING POWER CABLE

(71) Applicant: NKT Cables Group A/S, Brøndby (DK)

(72) Inventors: Dag Willén, Klagshamn (SE); Carsten Thidemann, Jaegerspris (DK); Martin Pitzer, Bonn (DE)

(73) Assignee: NKT Cables Group A/S, Brøndby (DK)

( * ) Notice: Subject to any disclaimer, the term of this patent is extended or adjusted under 35 U.S.C. 154(b) by 239 days.

(21) Appl. No.: 17/654,442

(22) Filed: Mar. 11, 2022

(65) Prior Publication Data
US 2022/0301744 A1 Sep. 22, 2022

(30) Foreign Application Priority Data
Mar. 22, 2021 (EP) ..................................... 21164035

(51) Int. Cl.
*H01B 12/06* (2006.01)
(52) U.S. Cl.
CPC .................... *H01B 12/06* (2013.01)
(58) Field of Classification Search
None
See application file for complete search history.

(56) References Cited

U.S. PATENT DOCUMENTS

| 6,313,408 | B1 | 11/2001 | Fujikami et al. | |
|---|---|---|---|---|
| 6,596,945 | B1 * | 7/2003 | Hughey | H01B 12/02 505/887 |
| 7,748,102 | B2 * | 7/2010 | Manousiouthakis | H01B 12/16 29/599 |
| 7,763,806 | B2 * | 7/2010 | Hirose | H01B 12/02 174/125.1 |
| 7,840,244 | B2 * | 11/2010 | Hirose | H01B 12/16 505/231 |
| 7,840,245 | B2 * | 11/2010 | Hirose | H01B 12/16 505/231 |
| 7,985,925 | B2 * | 7/2011 | Fischer | H01B 12/10 29/599 |
| 8,134,072 | B2 * | 3/2012 | Allais | H01B 12/16 174/15.5 |
| 8,938,278 | B2 * | 1/2015 | van der Laan | H10N 60/203 505/231 |
| 9,006,146 | B2 * | 4/2015 | Mukoyama | C01G 3/00 174/125.1 |

(Continued)

FOREIGN PATENT DOCUMENTS

| JP | 2011076924 A | 4/2011 | |
|---|---|---|---|
| JP | 5385746 B2 | 1/2014 | |
| WO | WO-2015033768 A2 * | 3/2015 | ............. H01B 12/06 |

OTHER PUBLICATIONS

US Certificate of Correction; Application No. 6,313,408 B1; Oct. 1, 2002; 1 Page.

(Continued)

*Primary Examiner* — Xanthia C Relford
(74) *Attorney, Agent, or Firm* — Whitmyer IP Group LLC

(57) ABSTRACT

A superconducting power cable having: a former including: an axially stretchable core, and a plurality of elongated outer elements wound helically around the core, wherein the core includes a first material and the elongated outer elements include a second material thermally contracting less than the first material at the operating temperature of the superconducting power cable; and a superconducting conductor layer arranged around the former.

19 Claims, 2 Drawing Sheets

(56) References Cited

U.S. PATENT DOCUMENTS

| | | | |
|---|---|---|---|
| 9,959,955 B2 * | 5/2018 | Na | H01B 7/20 |
| 2005/0011666 A1 * | 1/2005 | Hughey | H01B 12/16 |
| | | | 174/125.1 |
| 2005/0103519 A1 * | 5/2005 | Brandsberg | H01B 12/16 |
| | | | 174/125.1 |
| 2005/0194178 A1 * | 9/2005 | Xin | H01B 12/06 |
| | | | 174/125.1 |
| 2008/0293575 A1 * | 11/2008 | Hirose | H01B 12/16 |
| | | | 505/430 |
| 2009/0124505 A1 * | 5/2009 | Hirose | H01B 12/02 |
| | | | 174/125.1 |
| 2010/0099571 A1 | 4/2010 | Usoskin | |
| 2012/0214675 A1 | 8/2012 | Van Der Laan | |
| 2013/0165324 A1 * | 6/2013 | Jang | H01B 12/16 |
| | | | 174/15.5 |
| 2015/0024943 A1 * | 1/2015 | Sugimoto | C22F 1/08 |
| | | | 428/656 |
| 2019/0221335 A1 | 7/2019 | Yamaguchi | |
| 2020/0059017 A1 * | 2/2020 | Huang | H01R 4/68 |

OTHER PUBLICATIONS

Extended European Search Report; Application No. 21164035.4; Completed: Jul. 19, 2021; Issued: Jul. 29, 2021; 7 Pages.

* cited by examiner

SUPERCONDUCTING POWER CABLE

TECHNICAL FIELD

The present disclosure generally relates to superconducting power cables.

BACKGROUND

Superconducting power cables use superconducting material as conductor, usually in the form of a tape layer. An electrical insulation is provided over the superconducting material. A mechanically flexible inner cryostat wall is arranged over the electrical insulation. The inner cryostat wall is typically followed by a super insulation, and an outer cryostat wall. Liquid coolant such as liquid nitrogen flows inside the inner cryostat wall for cooling the superconducting material to a cryogenic temperature.

Superconducting power cables may also comprise a former. The former is typically arranged centred with respect to the taped superconducting material, which is provided around the former. The former may be a hollow tube, in which case it may act as a return path for the liquid nitrogen. Alternatively, the former may be solid made of for example copper. In this case, the former may act as a fault current shunt.

An issue with formers is that they contract axially and radially at the cryogenic operating temperature of the superconducting power cable, compared to their state in room temperature. Without attending to this matter, the former as well as the superconducting material arranged around the former would be subjected to high stress because the former is fixed to the cable terminations. One way to address this issue is to make the former longer than required. The former may for example be arranged slack at room temperature, so that it straightens out when it contracts axially at the operating temperature. This configuration however makes the cross-section of the superconducting power cable larger, to accommodate the slacking former.

US2009/124505 A1 discloses a superconducting cable comprising a former. The former includes a core member, a stress relaxation layer and a normal conducting layer with shunt functionality outside the stress relaxation layer. The stress relaxation layer is formed of a composite tape of Kraft paper and polypropylene film laminated together with the function to absorb radial contraction of the normal conducting layer due to thermal contraction.

SUMMARY

The normal conducting layer of US2009/124505 A1 is however also subjected to thermal contraction in the axial direction. This causes stress on the normal conducting layer due to its fixation to the cable terminations.

In view of the above, an object of the present disclosure is to provide a superconducting power cable which solves, or at least mitigates problems of the prior art.

There is hence provided a superconducting power cable comprising: a former including: an axially stretchable core, and a plurality of elongated outer elements wound helically around the core, wherein the core comprises a first material and the elongated outer elements comprise a second material thermally contracting less than the first material at the operating temperature of the superconducting power cable; and a superconducting conductor layer arranged around the former.

The first material thus contract more in the axial and radial directions than the second material at the cryogenic temperature at which the superconducting power cable is operated. Due to its ability to stretch axially, the core will not be subjected to as much axial stress when fixed to cable terminations. Due to the elongated outer elements being laid helically they will essentially maintain their radial position relative to the core after thermal contraction. The pathlength of the helical winding of the elongated outer elements is reduced when the former is subjected to cryogenic temperature compared to the pathlength at room temperature. The pathlength is the total length of an elongated outer element as it extends one turn around the core.

Since the radial contraction of the core is greater than the reduction of the pathlength due to thermal contraction, there is an "excess length" of elongated outer element in each turn, which can thus contract axially without much shortening of the total length of the elongated outer elements. The axial thermal contraction of the former may in particular be made lower than 0.1%, i.e. less than 1 m per 1000 metre superconducting power cable. Thus, axial length contraction compensation is provided.

As a result of the axial contraction compensation, the superconducting power cable can be made more compact as e.g., no slacked former length is required inside the cryostat of the superconducting power cable.

The radial thermal contraction of the former may be in the range of 1-5%, in the range of 1-4%, in the range of 1-3%, or in the range of 1-2%.

With axially stretchable is meant that the core is elastic in the axial direction. The core may have a stiffness that is smaller than 1000 N per % of elongation, such as smaller than 500 N per % of elongation, such as smaller than 100 N per % of elongation. Thus, for example, for a 1% elongation a force of less than 1000 N would be required.

The stretchability of the core may be an extrinsic property obtained by the structural configuration of the core. The stretchability may thus according to one example not be an intrinsic property of the core material.

The core may consist of the first material and the elongated outer elements may consist of the second material.

The operating temperature of the superconducting power cable is a cryogenic temperature.

Cryogenic temperature as used herein may be 77 Kelvin.

The core may be the radially innermost component of the former.

The elongated outer elements may be arranged directly radially outside of the core.

The elongated outer elements may for example be wires, such as wires with circular or elliptical cross-section, or elements with trapezoidal, or keystone, cross-section.

According to one embodiment the second material thermally contracts at least 5 times less than the first material at the operating temperature of the superconducting power cable compared to room temperature.

The first material may for example have a thermal contraction in the range of 1-2% at cryogenic temperature compared to room temperature. The second material may for example have a thermal contraction in the range of 0.2-0.3% at cryogenic temperature compared to room temperature.

According to one embodiment the first material is electrically insulating.

According to one embodiment the first material is a polymer. The polymer may for example be polyethylene, polypropylene, polytetrafluoroethylene (Teflon®), polyimide or polyamide.

Polymeric materials may have a thermal contraction around 2% at cryogenic temperature compared to room temperature.

According to one embodiment the second material is electrically conductive. The former may thereby be able to provide shunt capabilities in case of fault currents.

The second material may according to one example be carbon fibres.

According to one embodiment the second material is metal.

According one embodiment the metal is copper, aluminium, stainless steel, or brass.

Copper may have a thermal contraction around 0.2-0.3% at cryogenic temperature compared to room temperature.

Stainless steel, carbon fibre or brass adds a fault current limiting function to the former due to higher resistivity than e.g., copper and aluminium.

According to one embodiment the core comprises a plurality of elongated core elements arranged in a stranded configuration forming core layers, and wherein adjacent core layers have core elements arranged with opposing lay direction.

According to one embodiment the core comprises a plurality of elongated core elements arranged helically.

The elongated core elements may be wires with a circular or elliptical cross-section, or elements with a trapezoidal cross-section.

The core may for example be a rod, a rod with cuts that allows stretching, a hollow tube with cuts that allows stretching, or a hollow spiral.

The core may according to one example comprise a plurality of connected rods, tubes, or beads.

According to one embodiment the elongated outer elements form outer former layers, wherein adjacent layers of the outer former layers have elongated outer elements arranged with opposing lay direction.

According to one embodiment the elongated core elements of the outermost core layer and the elongated outer elements of the innermost outer former layer are arranged with opposing lay direction.

According to one embodiment the elongated outer elements have a helix angle between 10 and 80 degrees. The helix angle may for example be in the range of 10°-70°, such as 10°-60° such as 10°-50°, such as 10°-40°, such as 10°-30°, or 15°-30°. The axial thermal contraction can thereby be made as small as possible.

According to one embodiment each elongated outer element has the same helix angle magnitude. The helix angle magnitude is the absolute value of the helix angle.

The elongated outer elements of an innermost outer former layer may for example have a helix angle in the range of 18°-25°.

The helix angle magnitude $\alpha_{f,n}$ of an outer former layer n, n being the n:th outer former layer with n=1 being the innermost outer former layer, may for example be in the range defined by $$0.7 \cdot \sqrt{\frac{1-(1-\kappa_2)^2}{(1-\kappa_2)^2-(1-\kappa_{1,n})^2}} \leq \tan \alpha_{f,n} \leq 1.3 \cdot \sqrt{\frac{1-(1-\kappa_2)^2}{(1-\kappa_2)^2-(1-\kappa_{1,n})^2}}$$

preferably in the range defined by $$0.8 \cdot \sqrt{\frac{1-(1-\kappa_2)^2}{(1-\kappa_2)^2-(1-\kappa_{1,n})^2}} \leq \tan \alpha_{f,n} \leq 1.1 \cdot \sqrt{\frac{1-(1-\kappa_2)^2}{(1-\kappa_2)^2-(1-\kappa_{1,n})^2}}$$

where $\kappa_2$ is the thermal contraction of the second material, and $$\kappa_{1,n} = 1 - \frac{(1-\kappa_1)D_{core} + 2\sum_{j=1}^{n-1}(1-\kappa_j)t_j + (1-\kappa_2)t_n}{D_{core} + 2\sum_{j=1}^{n-1}t_j + t_n}$$

where $D_{core}$ is the diameter at room temperature of the core, $t_j$ is the thickness at room temperature of the outer former layer j, and $\kappa_j$ is the thermal contraction from room temperature to operating temperature of the outer former layer j, and $t_n$ is the thickness of the outer former layer n.

The elongated outer elements of an outermost outer former layer may for example have a helix angle in the range of 20°-28°.

The elongated core elements may for example have a helix angle in the range of 10°-80°, such as 10°-70°, such as 10°-60° such as 10°-50°, such as 10°-40°, such as 10°-30°.

According to one embodiment the superconducting conductor layer comprises a plurality of elongated superconducting elements wound helically around the former.

The helix angle of the superconducting elements may for example be in the range of 10°-30°, such as 13°-25°, such as 13°-20°. The helix angle magnitude of the superconducting elements, $\alpha_{SC}$, may for example be in the range defined by $$0.7 \sqrt{\frac{1-(1-\kappa_{SC})^2}{(1-\kappa_{SC})^2-(1-\kappa_{former})^2}} \leq$$

$$\tan \alpha_{SC} \leq 1.3 \sqrt{\frac{1-(1-\kappa_{SC})^2}{(1-\kappa_{SC})^2-(1-\kappa_{former})^2}}$$

preferably in the range defined by $$0.8 \sqrt{\frac{1-(1-\kappa_{SC})^2}{(1-\kappa_{SC})^2-(1-\kappa_{former})^2}} \leq$$

$$\tan \alpha_{SC} \leq 1.1 \sqrt{\frac{1-(1-\kappa_{SC})^2}{(1-\kappa_{SC})^2-(1-\kappa_{former})^2}}$$

where $\kappa_{SC}$ is the thermal contraction of the superconducting elements and $$\kappa_{former} = 1 - \frac{(1-\kappa_1)D_{core} + 2\sum_{j=1}^{m}(1-\kappa_j)t_j + (1-\kappa_{SC})t_{SC}}{D_{core} + 2\sum_{j=1}^{m}t_j + t_{SC}}$$

$t_{SC}$ is the thickness of the superconducting elements at room temperature and $\kappa_{SC}$ is the thermal contraction from room temperature to operating temperature of the superconducting elements, and m is the number of outer former layers in the former.

In one example the superconducting layer is formed by at least two layers of helically wound superconducting elements.

The superconducting layer may according to one example comprise at most four, such as at most three, such as at most two layers of helically wound superconducting elements.

One embodiment comprises an insulation layer provided radially outside of the superconducting conductor layer, wherein the insulating layer consists of a third material which contracts more than the material of the superconducting elements and more than the second material.

The insulation layer will, due to its thermal contraction in the radial direction, provide radial pressure onto the superconducting elements. Beneficially, in case the superconducting elements are wound with a gap in the circumferential direction between adjacent superconducting elements at room temperature, radial thermal contraction of the former will result in that the size of the gaps is reduced. The radial pressure provided by the insulation layer further ensures that the gaps can be minimised or eliminated. The superconducting elements will thereby lay edge to edge without any gaps at cryogenic temperature. The superconducting conductor layer will thereby have an essentially smooth, gapless surface in the circumferential direction. The AC losses due to magnetic fields will thereby be significantly reduced.

The third material may be a composition comprising several elements or substances.

A smoothing layer may be arranged on each side of the insulating material in order to smooth out the electrical fields. The smoothing layer may be made of a fourth materials which is electrically conducting or semiconducting. The fourth material has a similar thermal contraction as the third material, or it is mechanically weaker in its in-plane compression than the third material, so that it follows the insulating layer when the latter contracts upon cooling from room temperature to cryogenic temperature.

At room temperature, the superconducting elements may be arranged in a polygonal shape around the former. This is because of the stiffness of the materials in the superconducting elements and the small diameter of the former made possible by its inventive structure. The superconducting elements will thus in room temperature not fully bear against the outer surface of the former as they are laid around the former. Contact will only be made at certain points.

In case the insulation layer consists of the third material which contracts more than the material of the superconducting elements and more than the second material, the superconducting elements can be laid with a helix angle in the range 10°-30°, such as 10°-25°, preferably 10°-20°, more preferably 12°-18°. The pitch of the superconducting elements is thereby increased, whereby the bending radius of the superconducting elements is increased. The superconducting elements will thereby be subjected to less mechanical stress. The smaller helix angle magnitude is made possible by the larger radial contraction that occurs when the superconducting elements are pressed onto the former. By this means, the radial contraction can be increased by a factor of in the range of 1 to 2.5, preferably in the range of 1.4 to 1.8. Moreover, the pressure applied by the insulation layer onto the superconducting conductor layer causes the superconducting elements to obtain a more circular shape instead of the polygonal shape at the operating temperature of the superconducting power cable, giving the superconducting power cable better electrical properties with regards to losses.

According to one embodiment the insulation layer is a tape consisting of a polyolefin material.

Generally, all terms used in the claims are to be interpreted according to their ordinary meaning in the technical field, unless explicitly defined otherwise herein. All references to "a/an/the element, apparatus, component, means, etc." are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
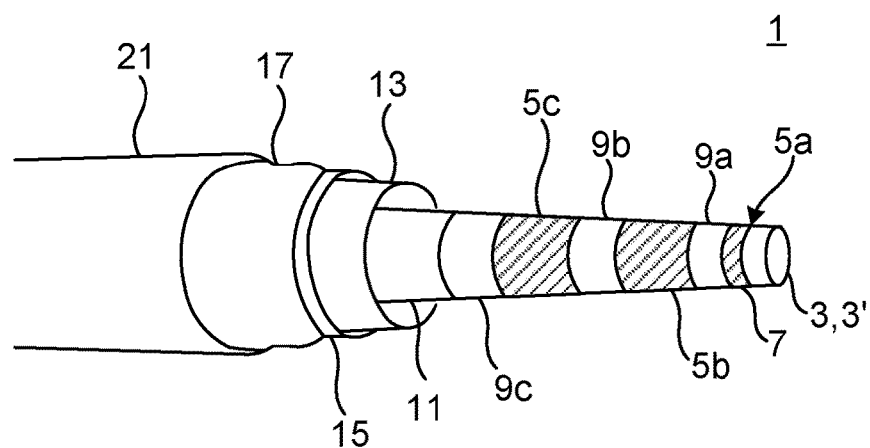
FIG. 1 schematically shows an example of a superconducting power cable.

FIG. 1 schematically shows an example of a superconducting power cable 1. The exemplified superconducting power cable 1 is a multi-phase AC cable. The exemplified superconducting power cable 1 has a triax configuration as shown in FIG. 1 but could alternatively have multiple power cores arranged along separate axes. The superconducting power cable may alternatively be a single-phase AC power cable or a DC power cable.

The superconducting power cable 1 may be a high voltage or a medium voltage superconducting power cable 1.

The superconducting power cable 1 comprises a former 3, 3'. The former 3, 3' is in this example arranged centrally in the superconducting power cable 1. In examples comprising several electric phases arranged along separate axes, there would be one former for each phase, and the formers would be the centre of a respective phase.

The superconducting power cable 1 comprises a superconducting conductor layer Sa arranged around the former 3, 3'. The superconducting conductor layer Sa comprises a plurality of elongated superconducting elements 7 wound helically around the former 3, 3'.

The elongated superconducting elements 7 may for example be superconducting tapes.

The superconducting power cable 1 comprises an insulation layer 9a arranged around the superconducting conductor layer Sa.

The exemplified superconducting power cable 1 comprises further superconducting conductor layers 5b and 5c and further insulation layers 9b and 9b. The second superconducting conductor layer 5b is arranged radially outside the insulation layer 9a, and the second insulation layer 9b is arranged radially outside of the second superconducting conductor layer 5b. The third superconducting conductor layer 5c is arranged radially outside of the second insulation layer 9a, and the third insulation layer 9c is arranged radially outside of the third superconducting conductor layer Sc.

The insulation layers 9a-9c may be structurally the same. The superconducting conductor layers 5a-5c may be structurally the same.

Each of the superconducting conductor layers 5a, 5b, 5c may be a respective phase conductor.

The superconducting power cable 1 comprises a screen 11 arranged around the third insulation layer 9c. The screen 11 may be made of metal material such as copper. The screen 11 may be the neutral conductor.

The superconducting power cable 1 comprises an inner cryostat 13 enclosing the screen 11. The inner cryostat 13 may be a metal tube. The inner cryostat 13 may be corrugated.

The inner cryostat 13 is in operation connected to a cooling fluid system for flowing a cooling fluid through the inner cryostat 13 to cool the superconducting conductor layers 5a, 5b, 5c. The cooling fluid may for example be liquid nitrogen.

The superconducting power cable 1 comprises super insulation 15 arranged around the inner cryostat 13. The super insulation 15 is a thermal insulation for thermally insulating the inner cryostat 13.

The superconducting power cable 1 comprises an outer cryostat 17 enclosing the super insulation 15. The outer cryostat 17 may be a metal tube. The outer cryostat 17 may be corrugated.

The superconducting power cable 1 comprises an outer sheath 21. The outer sheath 21 may for example comprise a polymeric material.

Figure 2:
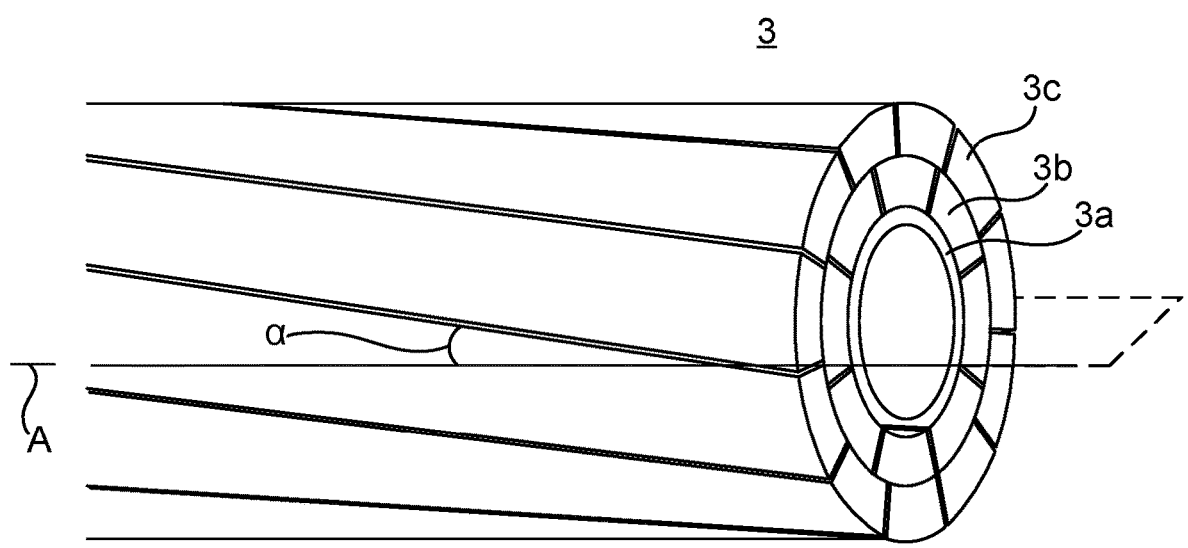
FIG. 2 schematically shows an example of a former.

Turning now to FIG. 2 a perspective view of an example of the former 3, 3' in FIG. 1 is shown.

The former 3 comprises a core 3a. The core 3a is axially stretchable. In this example, the core 3a is a tube. The core 3a could however alternatively for example be formed by elongated core elements extending helically along the axial direction of the former 3. The elongated core elements could for example have a trapezoidal or circular cross-sectional shape. The core could alternatively be a rod, a rod with cuts or grooves, hollow tube with cuts or grooves, or a hollow spiral.

The core 3a is made of a first material. The first material may for example be a polymer such as polyethylene, polypropylene, polytetrafluoroethylene or polyamide. The polymeric material may be electrically insulating or semiconducting.

The former 3 comprises a plurality of elongated outer elements 3b, 3c arranged helically around the core 3a.

The elongated outer elements 3b, 3c may have a trapezoidal cross-sectional shape.

The elongated outer elements 3b, 3c may be arranged in a plurality of outer former layers. The number of outer former layers may for example be 2, 3 or 4.

The outer former layers are arranged with alternating lay direction. For example, in the two-layer configuration shown in FIG. 2, the innermost outer former layer has a lay direction in a first direction which is either S or Z, or left or right, and the outermost outer former layer has a lay direction in a second direction, which is opposite to the S or Z/left or right lay direction of the first outer former layer.

In case the core 3a is made of elongated core elements that are helically arranged in a single layer, the elongated core elements may have a lay direction which is opposite to that of the innermost outer former layer.

The elongated outer elements 3b, 3c may have a helix angle $\alpha$ in the range of 10°-80°. The helix angle $\alpha$ may for example be in the range of 10°-70°, such as 10°-60° such as 10°-50°, such as 10°-40°, such as 10°-30°.

The helix angle $\alpha$ is the angle between a central plane A containing the central longitudinal axis of the former 3 and an elongated outer element 3a, 3b as it intersects the central plane A.

The elongated outer elements 3b, 3c are preferably electrically conducting. The elongated outer elements 3b, 3c are made of a second material. The second material may for example be metal such as copper, aluminium, stainless steel, brass, or it may be carbon fibres.

The first material thermally contracts more than the second material at cryogenic temperature compared to room temperature. The first material may for example contract at least 5 times more than the second material.

Figure 3:
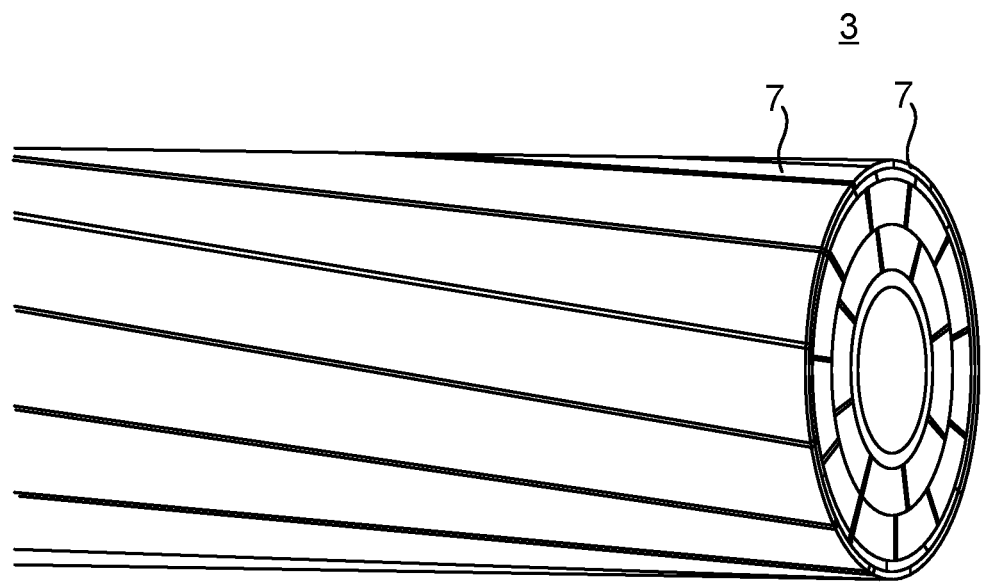
FIG. 3 schematically shows the former in FIG. 2 provided with superconducting conductor layers.

FIG. 3 shows the former 3 in FIG. 2 with the superconducting conductor layer 5a arranged around the outermost outer former layer. The exemplified superconducting conductor layer Sa comprises two layers of elongated superconducting elements 7 arranged helically around the former 3. The elongated superconducting elements 7 of the two layers may be arranged offset from each other in the circumferential direction.

The elongated superconducting elements 7 may be formed by high temperature superconducting (HTS) tape.

The elongated superconducting elements 7 may be wound helically around the former with a gap between adjacent elongated superconducting elements 7 in the same layer at a non-cryogenic temperature, such as at a temperature in the range of 10° C.-30° C. When the superconducting power cable 1 is cooled to cryogenic temperature, the former 3 will thermally contract radially such that the size of the gaps is reduced. This leads to lower AC losses.

The insulation layer 9a provided radially outside of the superconducting conductor layer 5a consists of a third material which contracts more than the material of the elongated superconducting elements 7 and more than the second material. The insulation layer 9a will thereby contract thermally more than the superconducting conductor layer and the elongated outer elements 3b, 3c of the former 3, and therefore put radial pressure on the elongated superconducting elements 7. Any gaps between adjacent elongated superconducting elements 7 in the same layer are thereby essentially eliminated at cryogenic temperature.

The insulation layer may for example be a tape consisting of a polyolefin material. The insulation layer could alternatively be an extruded insulation layer comprising a polyolefin material.

Figure 4:
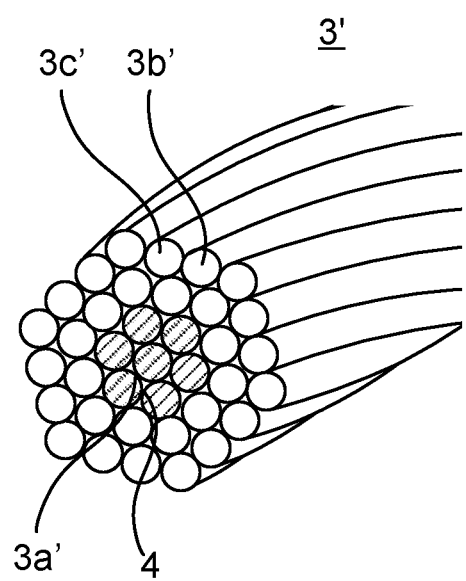
FIG. 4 schematically shows another example of a former.

FIG. 4 shows another example of a former. The former 3' The comprises a core 3a'. The components of the core 3a' are shown with dashed lines. The core 3a' is axially stretchable. This example differs from the former 3 in that the core 3a' comprises a plurality of elongated core elements 4 arranged with a stranded configuration. The elongated core elements 4 may for example be wires. The elongated core elements 4 may for example have a circular cross-section.

The exemplified core 3a' comprises a centre elongated core element and a plurality of elongated core elements arranged stranded around the centre elongated core element, thereby forming a core layer. In case there are several core layers, the elongated core elements 4 may be arranged helically with alternating lay direction for each core layer.

As an example, the core 3'a may comprise a centre elongated core element, 6 elongated core elements in a first core layer arranged around the centre elongated element, and 12 elongated core elements around the first core layer in a second core layer.

The elongated core elements may have a helix angle in the range of 10°-80°, such as 10°-70°, such as 10°-60° such as 10°-50°, such as 10°-40°, such as 10°-30°.

The former 3' comprises elongated outer elements 3b' and 3c' arranged helically in a stranded configuration around the core 3a'. The elongated outer elements 3b' and 3c' may be arranged in a plurality of outer former layers. The elongated outer elements 3b' and 3c' may for example be wires. The elongated outer elements 3b' and 3c' may have a circular cross-section.

The elongated outer elements 3b' and 3c' may be arranged helically with alternating lay direction for each outer former layer. The elongated outer elements of the innermost outer former layer may have a lay direction which is opposite to that of the elongated core elements of the outermost core layer.

As an example, an innermost layer of elongated outer elements may comprise 18 elongated outer elements, followed by a layer of 24 elongated outer elements.

The elongated outer elements have a helix angle between 10 and 80 degrees. The helix angle may for example be in the range of 10°-70°, such as 10°-60° such as 10°-50°, such as 10°-40°, such as 10°-30°.

Like in the first example, the core 3a' is made of a first material and the elongated outer elements 3b', 3c' are made of a second material contracting less than the first material at the operating temperature of the superconducting power cable 1.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A superconducting power cable comprising:
    a former including:
        an axially stretchable core, and
        a plurality of elongated outer elements wound helically around the core,
        wherein the core is the innermost component of the former, and
        wherein the core includes a first material and the elongated outer elements include a second material thermally contracting less than the first material at the operating temperature of the superconducting power cable; and
    a superconducting conductor layer arranged around the former.

2. The superconducting power cable as claimed in claim 1, wherein the second material thermally contracts at least 5 times less than the first material at the operating temperature of the superconducting power cable compared to room temperature.

3. The superconducting power cable as claimed in claim 1, wherein the first material is electrically insulating.

4. The superconducting power cable as claimed in claim 1, wherein the first material is a polymer.

5. The superconducting power cable as claimed in claim 1, wherein the second material is electrically conductive.

6. The superconducting power cable as claimed in claim 1, wherein the second material is metal.

7. The superconducting power cable as claimed in claim 6, wherein the metal is copper, aluminium, stainless steel, or brass.

8. The superconducting power cable as claimed in claim 1, wherein the core comprises a plurality of elongated core elements arranged in a stranded configuration forming core layers, and wherein adjacent core layers have core elements arranged with opposing lay direction.

9. The superconducting power cable as claimed in claim 1, wherein the elongated outer elements form outer former layers, wherein adjacent layers of the outer former layers have elongated outer elements arranged with opposing lay direction.

10. The superconducting power cable as claimed in claim 8, wherein the elongated core elements of the outermost core layer and the elongated outer elements of the innermost outer former layer are arranged with opposing lay direction.

11. The superconducting power cable as claimed in claim 1, wherein the elongated outer elements have a helix angle between 10 and 80 degrees.

12. The superconducting power cable as claimed in claim 11, wherein each elongated outer element has the same helix angle magnitude.

13. The superconducting power cable as claimed in claim 1, wherein the superconducting conductor layer comprises a plurality of elongated superconducting elements wound helically around the former.

14. A superconducting power cable comprising:
    a former including:
        an axially stretchable core, and
        a plurality of elongated outer elements wound helically around the core,
        wherein the core includes a first material and the elongated outer elements include a second material thermally contracting less than the first material at the operating temperature of the superconducting power cable;
    a superconducting conductor layer arranged around the former, wherein the superconducting conductor layer includes a plurality of elongated superconducting elements wound helically around the former; and
    an insulation layer provided radially outside of the superconducting conductor layer, wherein the insulating layer consists of a third material which contracts more than the material of the superconducting elements and more than the second material.

15. The superconducting power cable as claimed in claim 14, wherein the insulation layer is a tape consisting of a polyolefin material.

16. The superconducting power cable as claimed in claim 14, wherein the first material is electrically insulating.

17. The superconducting power cable as claimed in claim 14, wherein the first material is a polymer.

18. The superconducting power cable as claimed in claim 14, wherein the second material is electrically conductive.

19. The superconducting power cable as claimed in claim 14, wherein the second material is metal.

* * * * *